UNITED STATES PATENT OFFICE.

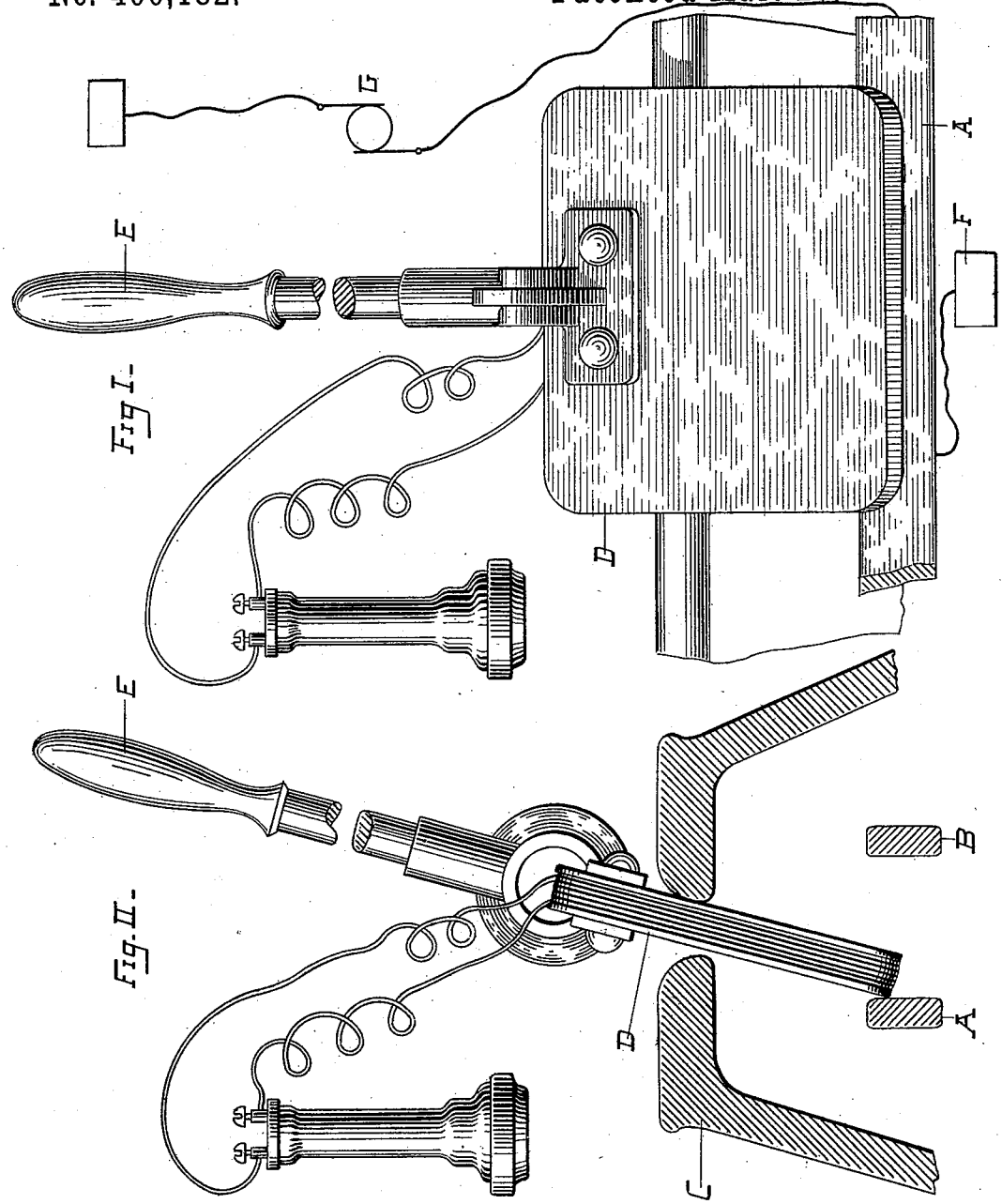

EDWARD M. BENTLEY, OF NEW YORK, N. Y.

FAULT-DETECTOR FOR ELECTRIC RAILWAYS.

SPECIFICATION forming part of Letters Patent No. 400,182, dated March 26, 1889.

Application filed December 17, 1888. Serial No. 293,827. (No model.)

*To all whom it may concern:*

Be it known that I, EDWARD M. BENTLEY, a citizen of the United States, residing at New York, in the county of New York, State of New York, have invented certain new and useful Improvements in Fault-Detectors for Electric Railways, of which the following is a specification.

My invention relates to electric-distribution systems, especially those in which the line-conductor is contained in an underground conduit, as in electric railways; and it consists in certain novel means for locating faults upon the line, as hereinafter described and claimed.

In a single-wire system having the ground as a return, when the line-conductor becomes accidentally grounded at any intermediate point a complete circuit is formed, and likewise in a two-wire system, when either conductor becomes grounded, or when both conductors become grounded or otherwise short-circuited, complete artificial circuits through the ground may be readily established. These circuits will include only such portions of the line conductor or conductors as are between the generator and the grounded point, so that it is apparent that whenever a fault occurs in either system there will be a variation in the current upon the conductor-sections preceding and succeeding the fault. My invention is based upon this fact, for by testing the line at various points with an indicator which is operated by the line-current the fault can be readily located.

My invention is illustrated in the accompanying drawings, wherein—

Figure 1 is a side view of my induction-indicator in proximity to a supply-conductor in a conduit. Fig. 2 is an end view of the indicator, the conduit appearing in cross-section.

A and B represent, respectively, the direct and return conductors of a two-wire distribution system, and C is an inclosing-conduit, of any desired construction, having its upper part formed, preferably, by iron or steel slot-rails. In an electric railway these conductors will be bared, so as to supply current to the traveling motors, and are of low resistance, so that the location of a ground thereon cannot be determined by measuring the resistance of the grounded circuit. These conductors are supported on opposite sides of and away from the slot by any desired means, so that there is an air-space of considerable extent between them.

D is an induction-coil, of such width as to be readily inserted and withdrawn through the slot in the conduit, and its upper side extends up through the slot, and is therefore out of the immediate induction-field of the line-conductor. The supply-wire is adapted to serve as the primary, and the induction-coil preferably consists of only a single coil acting as the secondary.

E is a supporting rod or pole, on the end of which the induction-coil is carried.

The presence or absence of a current in the induction-coil may be detected in many ways. I do it by including an indicating device in circuit therewith accessible from without the conduit, and the telephone is the preferable kind of indicator, as the induced currents are often very slight, and hence detected only by a sensitive instrument.

G is an irregular-current generator, shown in Fig. 1 in circuit with the ground and the line-conductor A, which is grounded at F. The kind of generator employed, however, is non-essential to my invention, as it is simply necessary that by some sort of means an irregular current be established in the grounded circuit.

I will now describe the manner of using my invention. Suppose that the conductor A, which is normally insulated, becomes grounded or short-circuited, as at F. An irregular electric current is sent over the conductor A and a return provided through the ground or fault. Only that portion of the line-conductor between the generator and the fault will be traversed by this current, and by moving the induction-coil along in proximity to the conductor the presence of a current will be indicated in the induction-coil until the fault is reached, but no farther. A useful function springs from the fact that the induction-coil is narrow and the line-conductors separated by a considerable space, for if the line be short-circuited the effects produced upon the induction-coil by the currents flowing in opposite directions upon the line-conductors tend to neutralize each other. In my device, however, the coil can be moved from side to side in the conduit, and when in proximity with one conductor it will be practically out of the induction-field of the other, so that either conductor can be examined without interference from the other.

So far as I know, this invention is broadly novel, so that I do not intend to be limited to the devices shown.

I claim as my invention—

1. The combination of a normally-insulated line-conductor grounded at a point between its two ends, and an electric circuit supplied with an irregular current and including the line-conductor and the grounded return, with an induction-coil adapted to be brought into proximity to the line-conductor at points preceding and succeeding the ground, and an indicator controlled by the current in the induction-coil.

2. The combination of a line-conductor normally insulated from its return, and a circuit including a portion only of the line-conductor, with a source of electricity sending an irregular current over said circuit, and an indicator operated by induction and adapted to be brought into proximity with the line-conductor at various points, for the purpose set forth.

3. The combination of a bared supply-conductor of low resistance adapted normally to supply current to the traveling motors upon an electric railway, and having a fault thereon at a point between its two ends, with an electric circuit, including a portion of the supply-conductor and the fault and traversed by an irregular current, an induction-coil in proximity to the supply-conductor at any desired point, and an indicator controlled thereby for detecting the presence of the irregular current in the corresponding portion of the supply-conductor, and thereby locating the fault.

4. The combination of a bared supply-conductor of low resistance extending along an electric railway and grounded at an intermediate point along its length, with an irregular-current generator in circuit with the supply-conductor and ground, whereby a complete circuit is established, including only a portion of the supply-conductor, and an induction-indicator adapted to be brought into proximity with the supply-conductor at successive points, for the purpose set forth.

5. A ground-detector for an electric railway having an inclosed conductor, which consists of an induction-coil adapted to move along in the inclosure in proximity to the conductor, having a connection attached thereto extending out through the slot of the inclosure and provided with an indicator in circuit therewith.

6. A ground-detector for an electric railway having an inclosed conductor, which consists of an induction-coil having a thickness less than the width of the slot, so as to be inserted and withdrawn therethrough, and provided with a connection extending through the slot, and an external indicator in circuit therewith.

7. A detector-coil for a conduit electric railway, having one straight longitudinal side adapted to be placed in proximity to the line-wire, the opposite side being arranged out of the immediate inductive field of said wire, and provided with a connection extending through the slot of the conduit, and with an external indicator.

8. A fault-detector adapted to be placed in proximity to a line-conductor for detecting a fault thereon, consisting of the induction-coil D, the telephone in circuit with the induction-coil, and the supporting rod or pole E, substantially as described.

9. The combination of a housed line-conductor traversed by an irregular electric current, with an accessible indicator, an intermediate induction-coil, and connections, whereby the indicator responds to changes in the current upon the inclosed conductor.

10. The combination of a slotted conduit, two line-conductors therein adapted to form the direct and return branches of an electric circuit and located on opposite sides of and away from the slot, with a narrow induction-coil movable from side to side within the conduit, and an indicator controlled thereby, whereby the current upon either conductor may be tested without interference from the other.

11. The combination of a slotted conduit and a supply-conductor housed therein, with an induction-coil adapted to be brought into proximity to the conductor, and a telephone outside the conduit, in circuit with the induction-coil, for testing the line.

12. The combination of a plurality of line-conductors inclosed in a common conduit and located at intervals apart, with an induction-coil movable in the conduit into proximity with any desired one of the conductors, and an indicator controlled by the induction-coil.

13. The combination of a metallic conduit and a line-conductor therein, with an induction-coil adapted to be brought into proximity to the inclosed conductor, and an indicator controlled by the induction-coil.

EDWARD M. BENTLEY.

Witnesses:
R. W. BLACKWELL,
JULIEN M. ELLIOT.